United States Patent [19]
White et al.

[11] Patent Number: 5,876,002
[45] Date of Patent: Mar. 2, 1999

[54] ARM AND MOUSE SUPPORT FOR OPERATING A COMPUTER

[76] Inventors: Vivia C. White, 5242 Fieldcrest, Alexandria, La. 71303; Louise L. Johnson, 111 Downing Ct., Bossier City, La. 71111

[21] Appl. No.: 853,886

[22] Filed: May 9, 1997

[51] Int. Cl.$^6$ ..................................................... B68G 5/00
[52] U.S. Cl. ........................... 248/118; 108/69; 248/918
[58] Field of Search ................................ 248/118, 118.1, 248/118.3, 918; 312/281; 108/69, 152

[56] References Cited

U.S. PATENT DOCUMENTS

| | | | |
|---|---|---|---|
| 937,639 | 10/1909 | Paulsen | 108/69 |
| 4,546,708 | 10/1985 | Wilburth | 248/918 X |
| 4,562,987 | 1/1986 | Leeds et al. | 248/918 X |
| 4,632,349 | 12/1986 | Anstey | 248/918 X |
| 5,240,210 | 8/1993 | Honto, Jr. et al. | 248/118.1 |
| 5,342,006 | 8/1994 | Tice | 248/118 |
| 5,402,972 | 4/1995 | Schmidt | 248/118 |
| 5,509,628 | 4/1996 | Noble | 248/118 |

Primary Examiner—Ramon O. Ramirez
Attorney, Agent, or Firm—John M. Harrison

[57] ABSTRACT

An arm and mouse support for attachment to a table or desk and supporting a mouse, mouse pad and computer user's arm. In a preferred embodiment the arm and mouse support includes a rectangular support plate terminated by a pair of spaced plate clamps and clamp screws for mounting on the front overhang of the desk top. In another embodiment the support plate has a corner clamp which mounts on a corner of the desk top and is fitted with a pair of clamp screws for securing the corner clamp and extending support plate on the desk top. In another embodiment the support plate is hingedly connected to the plate clamps or corner clamp, and pivots from the functional configuration to an inverted configuration, resting on the desk top. In another embodiment the support plate includes a drawer clamp for mounting on a drawer partially extended from the desk. In another embodiment a pair of laterally-adjustable mount brackets, each fitted with clamp screws, are mounted on the bottom surface of the support plate for receiving the respective side panels of a drawer extended from the desk. In a further embodiment a pair of pivoting clamps are mounted on the bottom surface of the support plate for receiving the respective side panels of a drawer and the front end of the pivoted, angled support plate rests on the desk top.

18 Claims, 4 Drawing Sheets

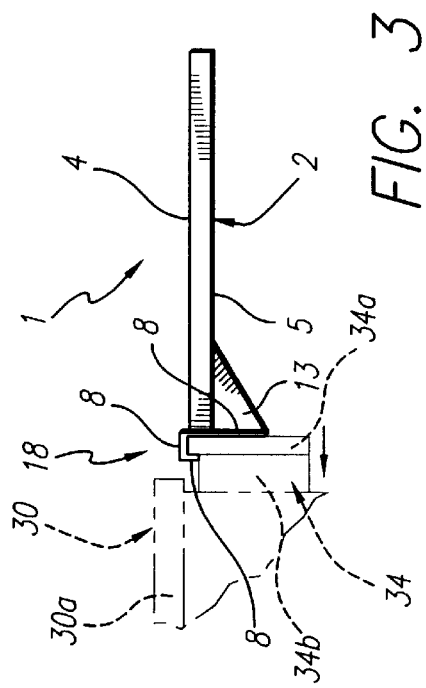
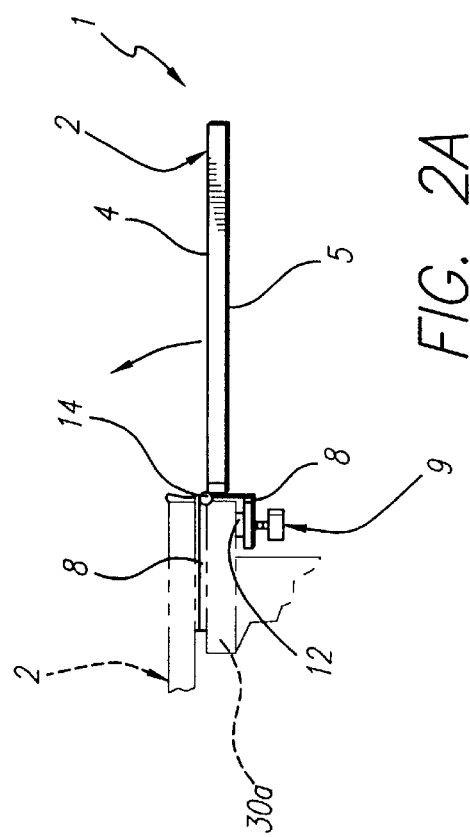
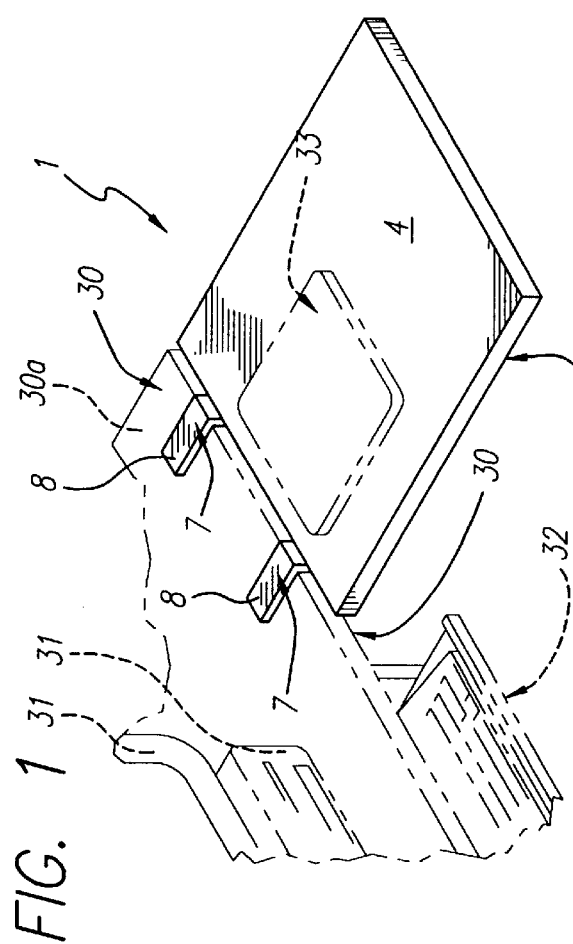
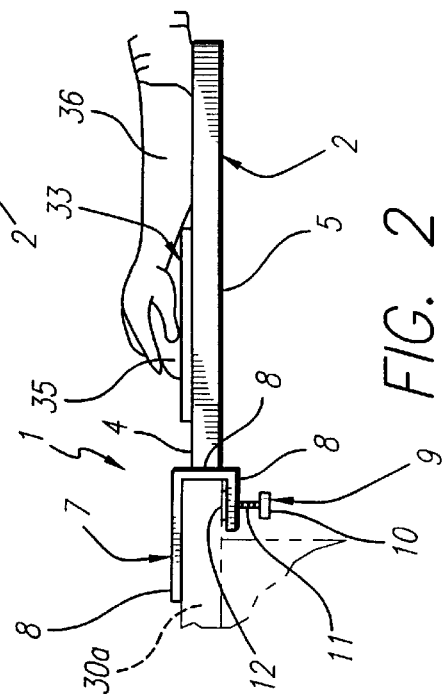

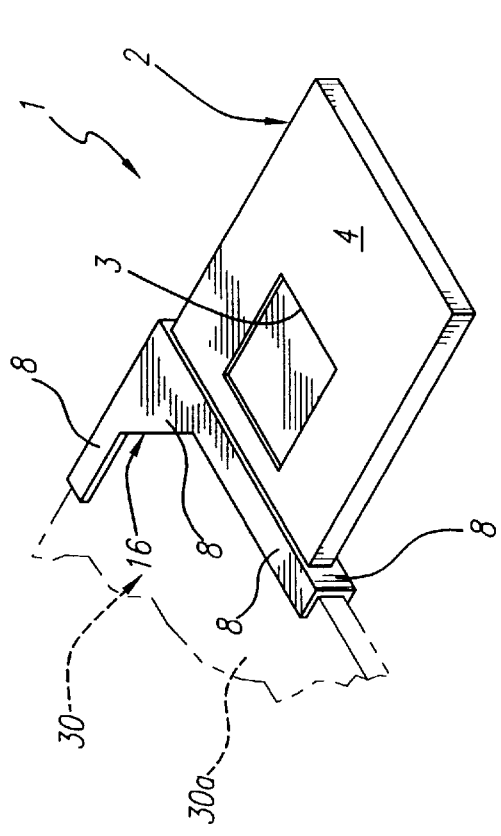
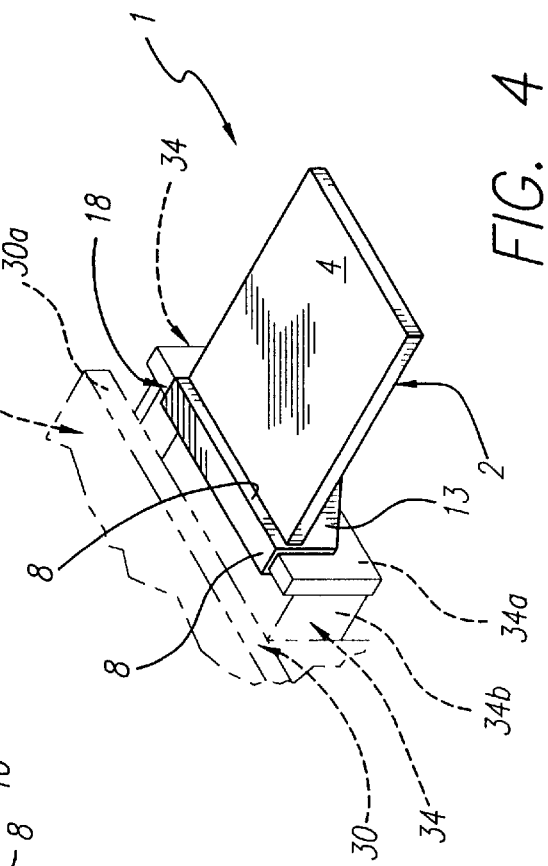
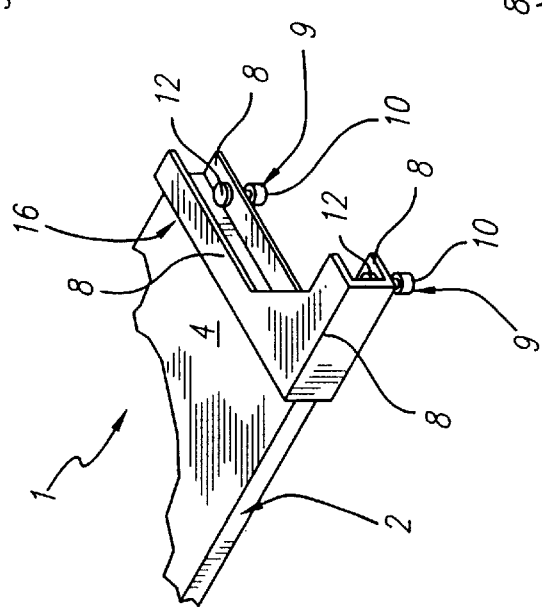

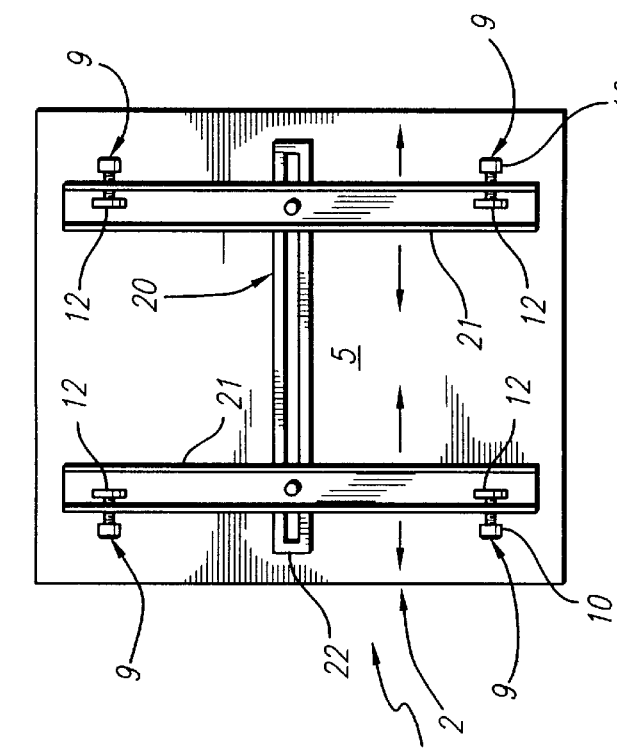
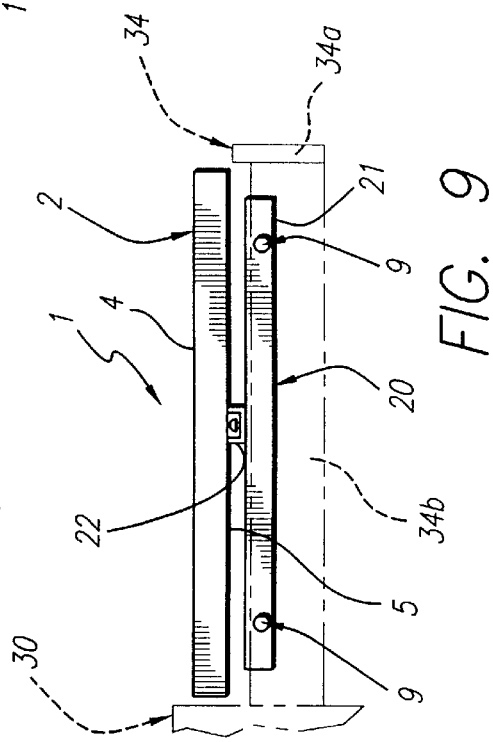
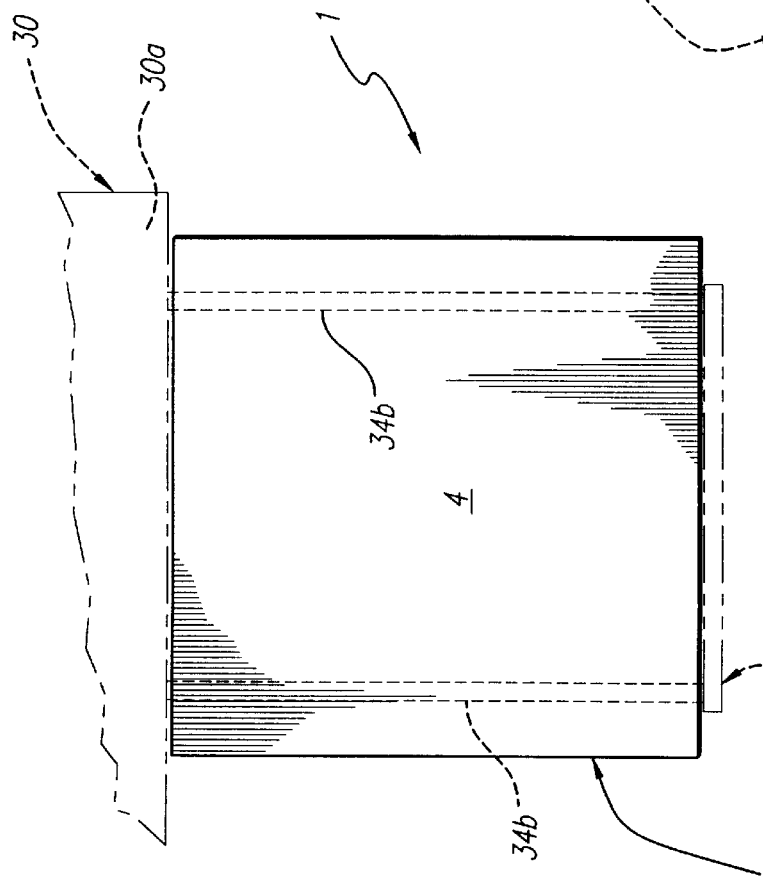

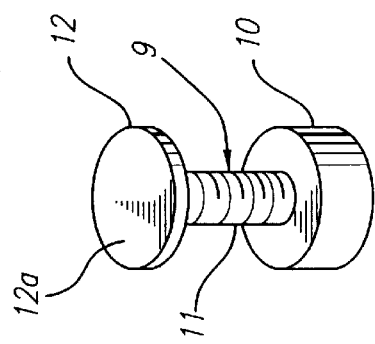
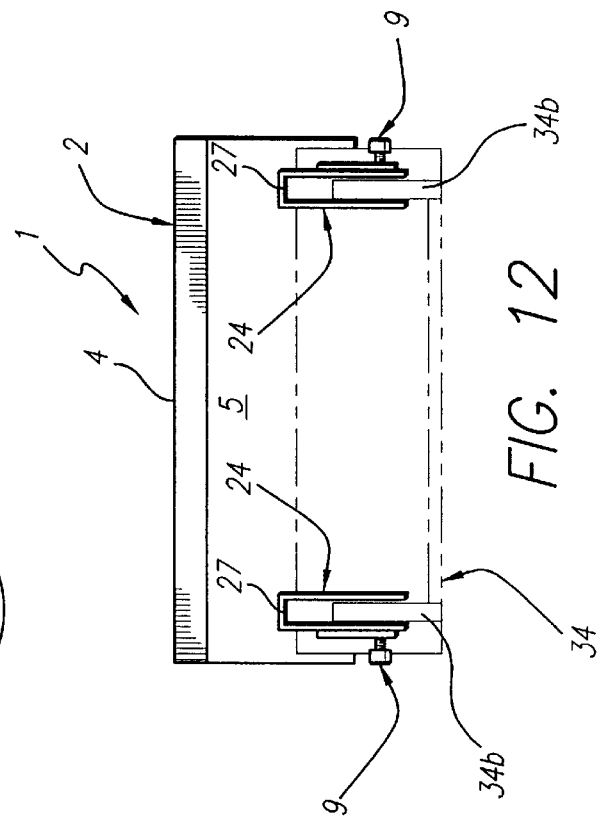
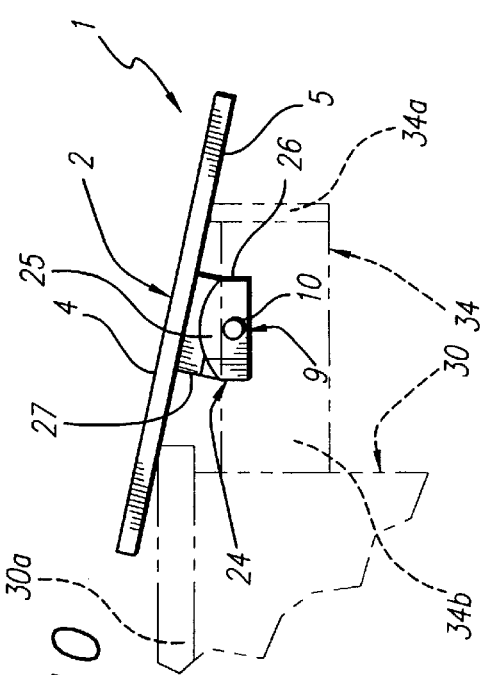
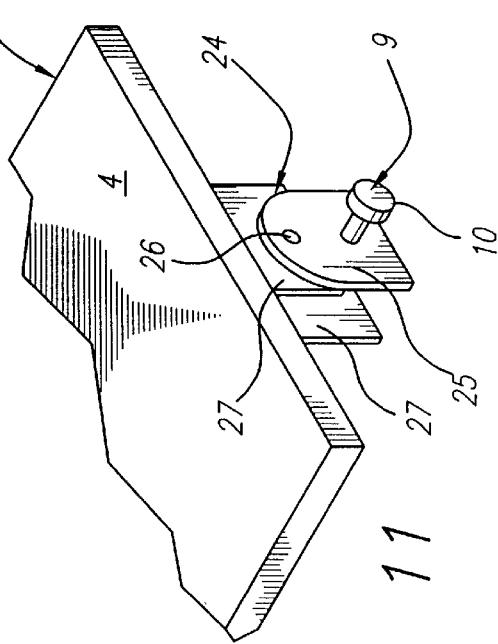

5,876,002

ARM AND MOUSE SUPPORT FOR OPERATING A COMPUTER

BACKGROUND OF THE INVENTION

1. Field of the Invention

This invention relates to support panels for extending desk or table tops and more particularly, to an arm and mouse support for attachment to the desk top or drawer of a desk or table and supporting a users arm, a mouse and a mouse pad for operating a computer resting on the desk or table top. In a first embodiment the arm and mouse support is characterized by a rectangular support plate terminated by a pair of spaced plate clamps for engaging the extending front of the desk top or table and a clamp screw is threaded in each plate clamp for engaging the table or desk top and securing the support plate in horizontally-extended or cantilever configuration from the desk or table. The mouse pad, mouse and user's forearm rest on the support plate and a pad recess may be optionally shaped in the support plate for receiving the mouse pad. In another embodiment the support plate includes a corner clamp for mounting on a corner of the table or desk top and fitted with a pair of clamp screws to secure the support plate to the desk or table top in cantilever configuration. In still another embodiment the support plate is hingedly attached to the plate clamps or corner clamp, and is pivotal from the extended, functional configuration, to an inverted, storage configuration resting on the desk top. In yet another embodiment, the support plate is terminated by a drawer clamp which is first fitted on the front panel of a drawer, partially extended from the desk or table and the drawer is then closed, with the support plate extending from the drawer clamp. In still another embodiment of the invention a pair of laterally-adjustable mount brackets, each fitted with a pair of clamp screws, are provided on the bottom surface of the support plate for receiving the respective runners or side panels of a drawer extended from the table or desk. In another embodiment a pair of pivoting clamps are mounted on the bottom surface of the support plate for receiving the respective runners of an extended drawer, and the support plate is pivoted on the clamps to rest the front end of the sloped plate on the desk or table top.

2. Description of the Prior Art

One of the problems realized in using a computer on a desk or table is that of finding adequate space for the computer and accessories, such as a mouse and mouse pad for the computer. Furthermore, in order to operate the mouse on the desk or table top, the operator must frequently maintain his or her arm in a partially raised position for extended periods of time, causing arm fatigue. Alternatively, the operator can extend a sliding side panel from the desk or table, if such a panel is available, for supporting the mouse and the user's forearm. The arm and mouse support of this invention provides a support plate which is easily and removably mounted on a desk top, table, or on a drawer extended from the desk or table, in order to extend the surface of the desk top or table and support the mouse pad and mouse in a more accessible location for the mouse user, and provide a support upon which the user's forearm may rest while operating the mouse.

An object of this invention is to provide an arm and mouse support for attachment to a desk or table and supporting a mouse and mouse pad for operating a computer resting on the desk top or table.

Another object of this invention is to provide an arm and mouse support for extending the desk top of a desk or table and supporting a mouse, mouse pad and user's arm for operating a computer resting on the desk top or table, which arm and mouse support is characterized by a support plate terminated by a pair of spaced plate clamps for engaging the desk top or table and fitted with respective clamp screws for clamping on the desk top or table and securing the support plate to the desk top or table in horizontally-extended or cantilever fashion.

Still another object of this invention is to provide an arm and mouse support characterized by a rectangular support plate terminated by a corner clamp for mounting on a corner of a table top or a desk top overhang and fitted with a pair of clamp screws for securing the corner clamp to the table or desk top, with the support plate extending from the desk top in cantilever fashion.

Yet another object of this invention is to provide an arm and mouse support characterized by a support plate which is hingedly mounted on a pair of plate clamps or a corner clamp designed to engage a table or the overhanging desk top of a desk, which support plate is pivotal from a horizontally-extended, functional configuration, to an inverted, storage configuration resting on the table or desk top.

Another object of this invention is to provide an arm and mouse support characterized by a rectangular support plate terminated by a drawer clamp which is first fitted on the front panel of a drawer partially extended from a structure such as a table or desk and the drawer is then closed, with the support plate in horizontally-extended configuration from the drawer.

Still another object of this invention is to provide an arm and mouse support fitted with an adjustable clamp including a pair of laterally-adjustable mount brackets mounted on the bottom surface of the support plate for receiving the respective runners or side panels of a drawer extended from a structure such as a table or desk, and each mount bracket is provided with a pair of clamp screws for securing the mount brackets to the runners of the drawer, with the support plate in horizontally-extended configuration with respect to the desk top.

Another object of this invention is to provide an arm and mouse support characterized by a pair of pivoting clamps mounted on the bottom surface of a rectangular support plate in spaced relationship with respect to each other for receiving the respective runners of a drawer extended from a table or desk, and each pivoting clamp is fitted with a clamp screw for securing the support plate on the runners, with the front end of the pivoted support plate resting on the table or desk top.

SUMMARY OF THE INVENTION

These and other objects of the invention are provided in an arm and mouse support for attachment to a table, desk or other structure and supporting a mouse and mouse pad for a computer resting on the structure, as well as the forearm of the user. In a preferred embodiment the arm and mouse support is characterized by a rectangular support plate terminated by a pair of spaced plate clamps for receiving the extending front overhang of the structure and each fitted with a clamp screw for securing the plate clamps to the structure, with the support plate in horizontally-extended or cantilever configuration. In another embodiment the support plate is terminated by a corner clamp which is secured to a corner of the top overhang of the structure and in still another embodiment the support plate is hingedly connected to the corner clamp or plate clamps and pivotal from an extended, functional configuration to an inverted, storage configuration resting on the structure top. In still another embodiment the support plate is terminated by a drawer clamp which is fitted on the front panel of a drawer partially extended from the structure, after which the drawer is closed, with the support plate extending from the drawer clamp. In another embodiment the support plate is fitted with an adjustable clamp, including a pair of laterally-adjustable mount brackets mounted in parallel relationship on the bottom surface of the support plate for receiving the respective runners or side panels of a drawer extended from the structure, and each of the mount brackets is fitted with clamp screws for securing the mount brackets to the runners. In yet another embodiment a pair of pivoting clamps are mounted on the bottom surface of the support plate in spaced relationship for receiving the respective runners of an extended drawer and fitted with clamp screws for securing the support plate to the runners. The support plate is pivoted on the clamps to rest the front end of the sloped plate on the structure top.

BRIEF DESCRIPTION OF THE DRAWINGS

The invention will be better understood by reference to the accompanying drawings, wherein:

FIG. 1 is a perspective view of a preferred embodiment of the arm and mouse support of this invention, mounted in functional configuration on the overhanging desk top of a desk (illustrated in phantom);

FIG. 2 is a side view of the arm and mouse support illustrated in FIG. 1;

FIG. 2A is a side view of an alternative hinged embodiment of the arm and mouse support;

FIG. 3 is a side view of a drawer clamp embodiment of the arm and mouse support, mounted in functional configuration on a drawer partially extended from the desk;

FIG. 4 is a perspective view of the arm and mouse support illustrated in FIG. 3;

FIG. 5 is a perspective view of a corner clamp embodiment of the arm and mouse support, mounted in functional configuration on the desk top of the desk;

FIG. 6 is a perspective view, partially in section, of the arm and mouse support illustrated in FIG. 5;

FIG. 7 is a top view of an adjustable clamp embodiment of the arm and mouse support, mounted in functional configuration on a drawer extended from the desk;

FIG. 8 is a bottom view of the arm and mouse support illustrated in FIG. 7;

FIG. 9 is a side view of the mounted arm and mouse support illustrated in FIGS. 7 and 8;

FIG. 10 is a side view of a pivoting clamp embodiment of the arm and mouse support mounted in functional configuration on a drawer extended from the desk;

FIG. 11 is a perspective view, partially in section, of the arm and mouse support illustrated in FIG. 10;

FIG. 12 is a front view of the mounted arm and mouse support illustrated in FIGS. 10 and 11.

FIG. 13 is a perspective view of a typical clamp screw for mounting the arm and mouse support.

DESCRIPTION OF THE PREFERRED EMBODIMENTS

Referring initially to FIGS. 1–2A and 13 of the drawings, in a preferred embodiment the arm and mouse support of this invention is generally illustrated by reference numeral 1. The arm and mouse support 1 includes a substantially rectangular, flat support plate 2, typically constructed from wood or a suitable alternative material such as plastic, and having a bottom surface 5 and a top surface 4 for supporting a mouse pad 33 and a computer mouse 35 (illustrated in FIG. 2). The mouse 35 is wired to a computer 31, resting on the desk top 30a of a desk 30, which typically includes an extendible keyboard support 32, as illustrated in FIG. 1. The support plate 2 additionally supports the forearm 36 of a computer operator, as further illustrated in FIG. 2, while the user operates the mouse 35. A pad recess 3 (FIG. 5) is optionally formed in the top surface 4 of the support plate 2 for receiving the mouse pad 33. A pair of plate clamps 7, include respective clamp flanges 8, typically screwed, bolted or otherwise rigidly attached to the front end of the support plate 2 in spaced relationship, for engaging the extending or overhanging front edge of the desk top 30a, as illustrated in FIG. 1 and hereinafter further described. As illustrated in FIGS. 2 and 13, each clamp flange 8 of the plate clamps 7 is provided with a clamp screw 9, having a threaded shaft 11, which threads through the bottom segment of the clamp flange 8 and is fitted on the lower end with a knurled grip knob 10 and on the upper end, with an engaging disk 12. The engaging disk 12 typically includes a padded or otherwise non-abrasive surface 12a, for engaging the bottom surface of the overhanging desk top 30a by rotation of the grip knob 10 of the clamp screw 9, thus securing each plate clamp 7 on the desk top 30a with the support plate 2 in substantially horizontally-extended or cantilever configuration. The arm and mouse support 1 is easily removed from the desk 30 by unthreading and disengaging the respective clamp screws 9 and removing the plate clamps 7 from the desk top 30a. As illustrated in FIG. 2A, in another embodiment each clamp flange 8 is pivotally attached to the front end of the support plate 2 by means of a clamp hinge 14. Accordingly, it will be appreciated that the support plate 2 may be pivoted from the extended, functional configuration to an inverted, storage configuration (illustrated in phantom) resting on the desk top 30a, when use of the arm and mouse support 1 is not desired.

Referring next to FIGS. 3 and 4 of the drawings, in still another embodiment of the invention a drawer clamp 18, formed with an elongated clamp flange 8, is mounted on the front end of the support plate 2. In application, the clamp flange 8 engages the front panel 34a of a desk drawer 34, which is partially extended from the desk 30 (illustrated in phantom), with the support plate 2 extending from the drawer clamp 18 in substantially horizontal configuration, as illustrated, and the drawer is then closed against the desk 30, as indicated by the arrow in FIG. 3. A gusset 13 is typically formed in the clamp flange 8 on each side of the drawer clamp 18 to reinforce the support plate 2 when the arm and mouse support 1 is located in functional configuration on the desk drawer 34. The arm and mouse support 1 is removed from a functional position on the desk drawer 34 by first extending the desk drawer 34 further from the desk 30 and then lifting the drawer clamp 18 and attached support plate 2 from the front panel 34a of the desk drawer 34.

Referring again to FIG. 2A and to FIGS. 5 and 6 of the drawings, in still another embodiment of the arm and mouse support of this invention a corner clamp 16, formed with a clamp flange 8 for receiving the front, corner and side portions of the desk top 30a, is rigidly mounted on the front end of the support plate 2, as illustrated in FIGS. 5 and 6 or, alternatively, pivotally mounted on the support plate 2 by means of a clamp hinge 14, as illustrated in FIG. 2A and heretofore described with respect to the first embodiment illustrated in FIGS. 1–2A. As illustrated in FIG. 6, a clamp screw 9 is threaded through the bottom segment of the clamp flange 8 at each end of the corner clamp 16 for engaging the bottom surface of the desk top 30a, by rotation of the grip knob 10 of the clamp screw 9 as heretofore described, thus securing the support plate 2 in substantially horizontal, functional configuration on the overhanging edge of the desk top 30a, as illustrated in FIG. 5.

Referring next to FIGS. 7–9 of the drawings, in yet another embodiment of the invention an adjustable clamp 20 is provided on the bottom surface 5 of the support plate 2 to facilitate mounting the support plate 2 on a desk drawer 34, extended from the desk 30, as illustrated in FIG. 7. The adjustable clamp 20 includes a slotted plate 22, mounted transversely on the bottom surface 5 of the support plate 2, and parallel mount brackets 21 are slidably mounted in the slotted plate 22 to allow lateral adjustment of the mount brackets 21, according to the width of the desk drawer 34, as hereinafter described. In application, the desk drawer 34 is fully extended from the desk 30, as illustrated in FIG. 7, the mount brackets 21 adjusted according to the relative spacing of the drawer runners 34b and then caused to receive the respective runners 34b, as illustrated in FIG. 9. Each of a pair of clamp screws 9 threaded into each mount bracket 21 is then tightened against the corresponding runner 34b of the desk drawer 34, to secure the support plate 2 in extended, horizontal, adjacent relationship with respect to the desk top 30a, as illustrated in FIG. 7. It will be appreciated by those skilled in the art that the laterally-adjustable feature of the mount brackets 21 facilitates adjusting the adjustable clamp 20 to accommodate the runners 34b of desk drawers 34 having various widths.

Referring next to FIGS. 10–12 of the drawings, in another embodiment a pair of pivoting clamps 24 are screwed, bolted or otherwise mounted on the bottom surface 5 of the support plate 2 in spaced relationship, for receiving the respective runners 34b of a desk drawer 34, partially extended from the desk 30, as illustrated in FIG. 10 and hereinafter further described. Each pivoting clamp 24 includes a U-shaped support plate bracket 27, fixed to the bottom surface 5 of the support plate 2 and a clamp screw plate 25 is pivotally attached to each support plate bracket 27 by means of a pivot pin 26. In application, the desk drawer 34 is partially extended from the desk 30 and the support plate bracket 27 of each pivoting clamp 24 receives the corresponding runner 34b of the desk drawer 34. The engaging disks 12 of the clamp screws 9, threaded through the corresponding clamp screw plates 25, are then tightened against the respective runners 34b of the desk drawer 34. The support plate 2 is finally pivoted slightly upwardly on the runners 34b, and the front end of the angled support plate 2 may be caused to rest on the desk top 30a, as illustrated in FIG. 10.

It will be appreciated by those skilled in the art that the arm and mouse support 1 of this invention, in the several variations described herein, contributes to efficient use of space on the desk top 30a of the desk 30, by providing a convenient location for the mouse pad 33 and mouse 35 of the computer 31, and further provides an arm rest for the computer user 36. It will be further appreciated that the various embodiments of the arm and mouse support 1 can be easily and quickly attached to or removed from the desk 30 with minimal effort and no scratching or other damage to the desk 30. Moreover, while the various configurations of the arm and mouse support 1 are illustrated in mounted configuration on the top overhang or drawer of a desk, the devices can equally well be attached to a table, drawer or other structure, as desired.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. An arm and mouse support for attachment to a structure and supporting a mouse and mouse pad for operating of a computer resting on the structure, said arm and mouse support comprising a support for supporting the mouse and mouse pad, and a corner clamp carried by said support and engaging the structure for attaching said support to the structure in substantially horizontal, extended configuration with respect to the structure.

2. The arm and mouse support of claim 1 comprising a pad recess shaped in said support for receiving the mouse pad.

3. The arm and mouse support of clam 1 comprising at least one plate clamp provided on said corner clamp for engaging the structure and tightening said corner clamp on the structure.

4. The arm and mouse support of claim 1 comprising a pad recess shaped in said support for receiving the mouse pad and comprising at least one plate clamp provided on said corner clamp for engaging the structure and tightening said corner clamp on the structure.

5. An arm and mouse support for attachment to a table or desk having a drawer and supporting a mouse and a mouse pad for operating a computer resting on the table or desk and further supporting the arm of a person operating the mouse, said arm and mouse support comprising a support plate for supporting the mouse pad, the mouse and arm of the mouse operator; a pair of attachment clamps pivotally carried by said support plate for engaging the drawer in the table or desk; and a clamp screw fitted in said attachment clamps for engaging the table or desk and securing said support plate to the drawer in the table or desk in selectively substantially horizontal, extended and pivoted configuration with respect to the table or desk.

6. The arm and mouse support of claim 5 comprising a pad recess shaped in said support plate for receiving the mouse pad.

7. An arm and mouse support for attachment to a pair of runners on a desk drawer extended from a desk and supporting a mouse pad and mouse for operating a computer resting on the desk top and supporting the arm of an operator operating the mouse, said arm and mouse support comprising a substantially rectangular support plate for supporting the mouse pad, mouse and arm of the operator; a pair of mount brackets provided on said support plate in substantially parallel relationship with respect to each other for receiving the runners of the drawer, respectively; and clamp means fitted in each of said mount brackets for securing said support plate to the runners of the drawer in substantially horizontal, extended relationship with respect to the desk top.

8. The arm and mouse support of claim 7 comprising a pad recess shaped in said support plate for receiving the mouse pad.

9. The arm and mouse support of claim 7 comprising a slotted plate mounted transversely on the bottom surface of said support plate and wherein said mount brackets are slidably mounted in said slotted plate for lateral adjustment.

10. The arm and mouse support of claim 7 comprising a pad recess shaped in said support plate for receiving the mouse pad and a slotted plate mounted transversely on the bottom surface of said support plate, and wherein said mount brackets are slidably mounted in said slotted plate for lateral adjustment.

11. An arm and mouse support for extending the desk top of a desk and supporting a mouse pad and mouse for operating a computer resting on the desk top and supporting the arm of an operator operating the mouse, said arm and mouse support comprising a support plate for supporting the mouse pad, mouse and arm of the operator; at least one attachment clamp hingedly carried by said support plate for receiving the desk top; and a clamp screw fitted in said attachment clamp for engaging the desk top and securing said support plate to the desk top, with said support plate pivotal from a first supporting position extending substantially horizontally from the desk top to a second, inverted position resting on the desk top.

12. The arm and mouse support of claim 11 comprising a pad recess shaped in said support plate for receiving the mouse pad.

13. The arm and mouse support of claim 11 wherein said attachment clamp comprises a pair of plate clamps provided on said support plate in spaced relationship with respect to each other.

14. The arm and mouse support of claim 11 comprising a pad recess shaped in said support plate for receiving the mouse pad and wherein said attachment clamp comprises a pair of plate clamps provided on said support plate in spaced relationship with respect to each other.

15. The arm and mouse support of claim 11 wherein said attachment clamp comprises a corner clamp for engaging the desk top.

16. The arm and mouse support of claim 15 comprising a pad recess shaped in said support plate for receiving the mouse pad.

17. An arm and mouse support for attachment to a pair of runners on a desk drawer extended from a desk and supporting a mouse pad and mouse for operating a computer resting on the desk top and further supporting the arm of an operator operating the mouse, said arm and mouse support comprising a support plate for supporting the mouse pad, mouse and arm of the operator and a drawer clamp provided on the end of said support plate for receiving the front panel of the drawer and supporting said support plate in substantially horizontal, extended configuration with respect to the desk top.

18. The arm and mouse support of claim 17 comprising a pad recess shaped in said support plate for receiving the mouse pad.

* * * * *